Mar. 3, 1925.
A. G. RONNING ET AL
COMBINED ENSILAGE HARVESTER AND CORN PICKER MACHINE.
Original Filed March 6, 1916   3 Sheets-Sheet 1

Inventors:
Andrean G. Ronning
Adolph Ronning.
By Whiteley and Ruckman
their Attorneys.

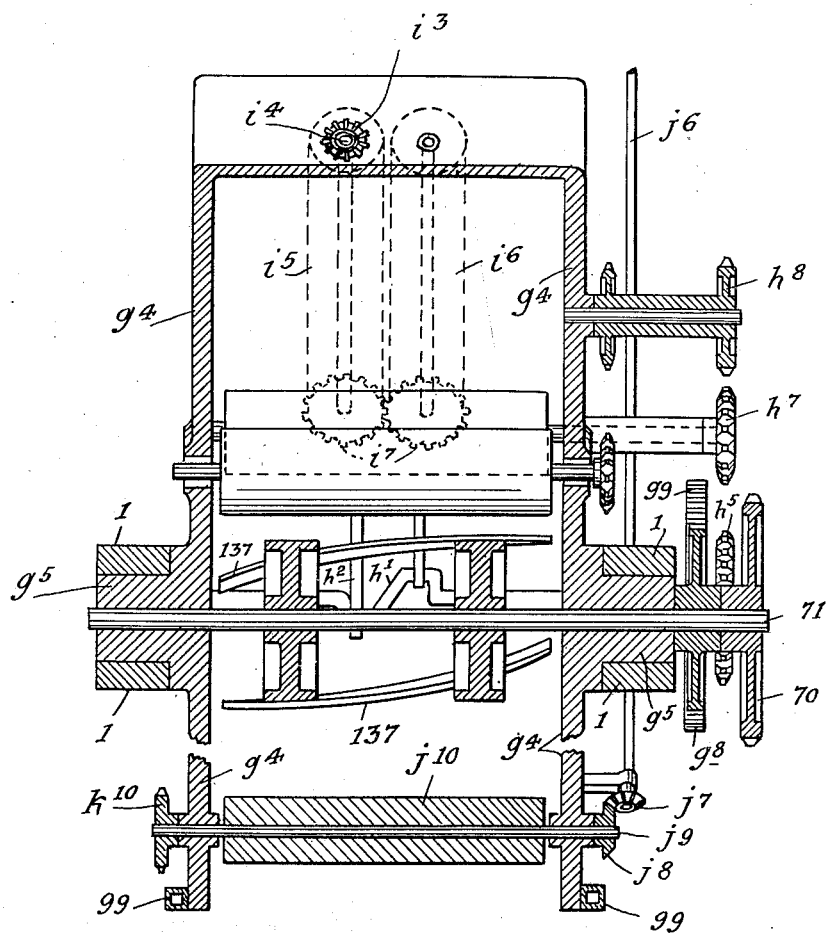

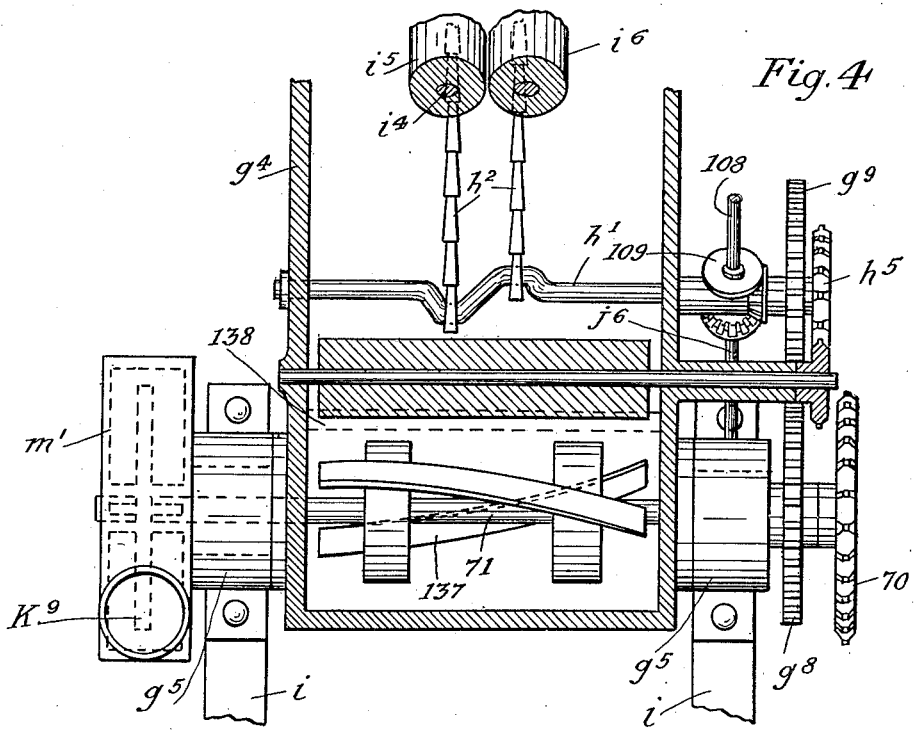
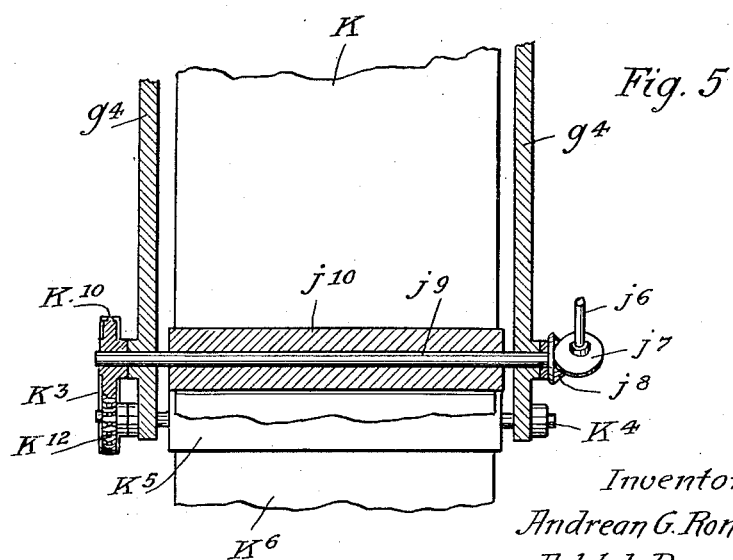

Patented Mar. 3, 1925.

1,528,635

UNITED STATES PATENT OFFICE.

ANDREAN G. RONNING AND ADOLPH RONNING, OF MINNEAPOLIS, MINNESOTA.

COMBINED ENSILAGE-HARVESTER AND CORN-PICKER MACHINE.

Original application filed March 6, 1916, Serial No. 82,516. Divided and this application filed June 30, 1919. Serial No. 307,736.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Combined Ensilage-Harvester and Corn-Picker Machines, of which the following is a specification.

Our invention relates to combined ensilage harvester and corn picker machines and an object is to provide a machine of this character which can be attached to a tractor for operation thereby. This application is a division of our prior application Serial No. 82,516, filed March 6, 1916 which subsequent to the filing of the present application matured into Patent No. 1,340,461, dated May 18, 1920.

Referring to the accompanying drawings,—

Figure 1:
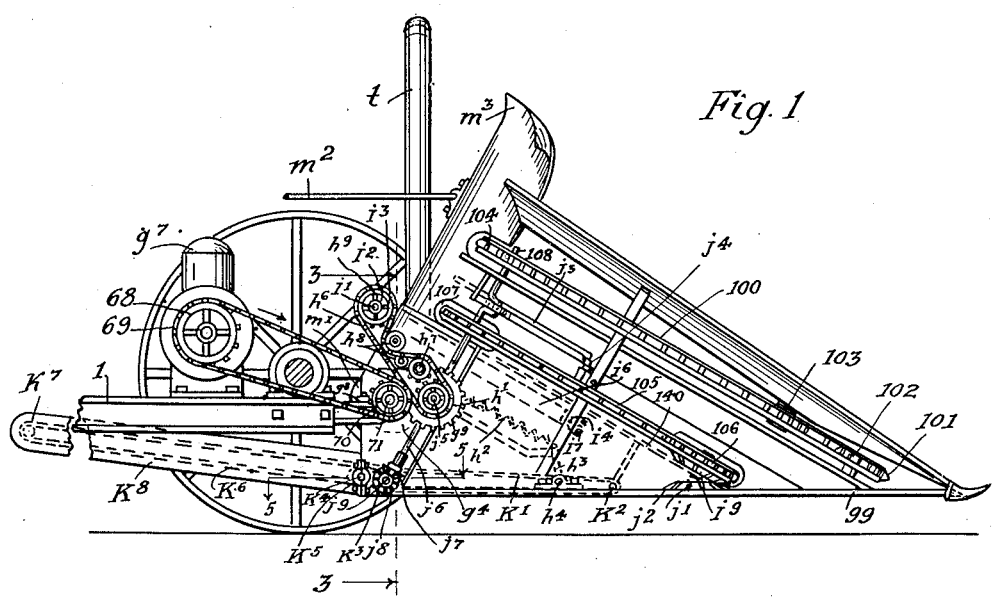
Figure 2:
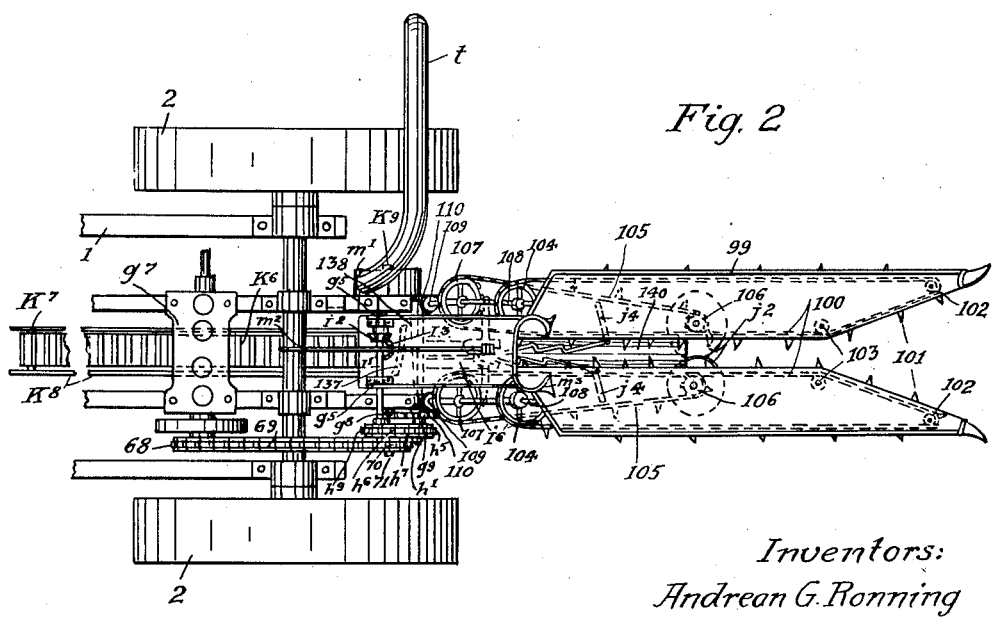

Fig. 1 is a side elevational view. Fig. 2 is a top plan view. Fig. 3 is a sectional view on the line 3—3 of Fig. 1. Fig. 4 is a partial sectional view illustrating the ensilage cutter cylinder shaft, the husking and snapping rollers and connections for driving the same. Fig. 5 is a horizontal section on the line 5—5 of Fig. 1.

The machine which constitutes the subject-matter of this application is adapted particularly for use in connection with a tractor, the frame 1 of which has front driving wheels 2 and either a single steering wheel or a pair of steering wheels at the rear. Gathering frames 99 are preferably rigidly attached to a casting $g^4$ which is provided with hollow lugs $g^5$, as shown in Fig. 3, extending outwardly from the casting and at right angles thereto, and which are suitably journaled in the front portion of the tractor frame 1. The ensilage cutter cylinder shaft 71 is journaled in the lugs $g^5$ and carries at one end a sprocket wheel 70. A sprocket chain 69 runs over the sprocket wheel 70 and over a spocket wheel 68 of the tractor clutch mechanism which may be operated by an engine $g^7$, thereby supplying power for operating the ensilage cutter, and a husking mechanism which will presently be described. The driving wheels 2 are driven in well known manner from the engine $g^7$. As best shown in Fig. 4, the shaft 71 carries a spur gear $g^8$ which meshes with a spur gear $g^9$ secured to a crank-shaft $h'$ journaled in the casting $g^4$, and this shaft is provided with a plurality of cranks to which are attached the rear ends of a plurality of shaker members $h^2$ the front ends of which are pivotally attached to a plurality of supporting members $h^3$ pivotally supported at their lower ends on a shaft $h^4$ suitably mounted in the frames 99 as shown in Fig. 1. The crank-shaft $h'$ is provided with a sprocket wheel $h^5$ which drives a sprocket chain $h^6$, the upward loop of which runs over feed roller sprocket wheels $h^7$ and $h^8$, best shown in Fig. 3, which are journaled at one side of the casting $g^4$ thereby operating the ensilage cutter feeding mechanism. The sprocket chain $h^6$ also runs at its upper portion over the sprocket wheel $h^9$ as shown in Fig. 1, which is secured to a shaft $i'$ journaled in the casting $g^4$ and provided with a beveled gear $i^2$ meshing with a beveled gear $i^3$ secured to the upper end of a shaft $i^4$ which is journaled in the frames 99 and the casting $g^4$ and carries a combined snapping and husking roller $i^5$ as shown in Figs. 3 and 4. A cooperating snapping and husking roller $i^6$ parallel to the roller $i^5$ is journaled in the frame 99 and the casting $g^4$. The rollers $i^5$ and $i^6$ are both provided at their lower ends with spur gears $i^7$ which mesh with each other for rotation in unison so as to feed the received stalks, butt ends first, between the feed rollers of the ensilage cutter, which delivers the stalks to the ensilage cutter cylinder knives 137 which, in cooperation with the ledger-plate 138, chop the stalks into suitable lengths for ensilage. The machine may if desired be provided with two pairs of snapping and husking rollers similar to the ones just described, the one pair being parallel and adjacent to the other and being operated from the common shaft $i'$. The snapping and husking rollers are of the kind ordinarily used in stationary corn shredders and huskers and need not be described in detail. The top boards of the gathering frames 99 incline downwardly toward the front and their inner edges diverge so as to guide the standing corn stalks into the channel between the gathering frames. The movement of the corn stalks is further insured by endless conveyers in the forms of sprocket chains provided with projecting teeth. As shown, there are four of these sprocket chains all inclined upwardly from front to rear and positively driven. The relatively long upper chains 100 are provided with teeth 101 and they are arranged to run over sprocket wheels 102, 103 and 104 mounted on the gathering frames 99. The relatively short lower sprocket chains 105 are arranged to run over sprocket wheels 106 and 107 also mounted upon the gathering frames 99. The sprocket wheels 102, 103 and 106 are idlers, while the sprocket wheels 104 and 107 are driving wheels which are secured on oblique shafts 108 journaled in the gathering frames and provided at their lower ends with beveled gears 109 meshing with beveled gears 110 which are secured to the shaft $h'$. The sickle mechanism shown is of the rotary-disk type operated by the lower gathering chains 105 and the sprocket wheels 106, the latter being provided on their lower sides with miter-gears $i^9$, Fig. 1, meshing with miter-gears $j'$ secured to the top side of the cutter disks $j^2$ which are journaled in the frames 99 and rotate in unison when set in motion by the gathering chains 105. The shafts 108 are provided with cranks to which the upper ends of feed members $j^3$ are pivotally attached, said feed members being connected at their lower ends to the inner ends of the crank arms $j^4$, Fig. 1, which are pivotally attached at their outer ends to the frames 99. One of the beveled gears 110, previously referred to, also meshes as shown in Fig. 4 with the beveled gear $j^5$ which is secured to the upper end of a shaft $j^6$ journaled in the casting $g^4$, and which carries on its lower end a beveled gear $j^7$, Fig. 5, meshing with a beveled gear $j^8$ secured to the outer end of a countershaft $j^9$ which is journaled in the casting $g^4$ and is provided with a roller $j^{10}$ over which runs a conveyer belt $k'$ which at its forward end runs between the members $h^3$ and over an idler roller $k^2$ journaled in the frames 99. As best shown in Fig. 5, the left-hand end of the shaft $j^9$ is provided with a sprocket wheel $k^{10}$ which carries a sprocket chain $k^3$, the rearward loop of which runs over a sprocket wheel $k^{12}$ secured to the left-hand end of a shaft $k^4$ parallel to the shaft $j^9$ and journaled in the casting $g^4$. The shaft $k^4$ carries a roller $k^5$ over which runs the endless conveyer belt $k^6$ which runs in its rearward and upward loop over an idler $k^7$ journaled at its ends in an elevator frame $k^8$ attached to the tractor frame 1 so as to deliver into the box of a wagon which is hitched to the rear of the tractor. The cylinder shaft 71, as shown in Fig. 4, is provided with a blower fan $k^9$ housed by a fan casing $m'$ provided with a blower pipe $t$ arranged to deliver into the box of a wagon driven along the side of the machine. The tractor may be provided at any suitable place with a cable winding mechanism to which a cable $m^2$ may be attached. The front end of the cable $m^2$ is attached to a hopper $m^3$ which is suitably attached to the frame 99 so as to receive the corn stalks from the gathering chains 100 and 105 and direct them, butt ends first, into direct engagement with the snapping and husking rollers $i^5$ and $i^6$.

The advantages and operation of our invention will be readily understood from the foregoing description. As the machine moves along the corn row the stalks are cut from the ground by the cooperating disks $j^2$, whereupon the gathering chains 100 and 105 convey the standing stalks upward and rearward with their butt ends riding through the U-shaped chute 140 assisted by the feed members $j^3$ until they are deposited in the hopper $m^3$, whereupon they are engaged at their butt ends by the snapping and husking rollers $i^5$ and $i^6$ and delivered therefrom, butt ends first, to the feed rollers of the ensilage cutter and conveyed thereby into direct engagement with the ensilage cutting knives 137 which are rapidly rotated by the engine. The cutting knives in cooperation with the ledger-plate 138 reduce the stalks to suitable lengths for ensilage, generating thereby sufficient centrifugal force and blast of air to carry and deliver the ensilage to the blower fan $k^9$, which forces the ensilage through the pipe $t$ into the box of a wagon driven alongside the machine. As the corn stalks are passed between the rollers $i^5$ and $i^6$, the corn ears are separated from the stalks, being larger than the stalks, and unable to pass between the rollers. Since these rollers are inclined downwardly at their front ends the corn ears thus removed from the stalks will gradually move forwardly and downwardly until they drop upon the conveyer belt $k'$. In the meantime the husks are removed by the customary pins and gripping devices on the rollers $i^5$ and $i^6$ and are delivered upon the shaker members $h^2$ which are provided at their tops as shown in Fig. 1 with teeth slanting upwardly and rearwardly so as to direct the husks into the ensilage cutter as the shakers are rapidly operated by the crank arms of the shaft $h'$ and at the same time separating the kernels of corn which may have been shelled by the rollers $i^5$ and $i^6$, allowing these kernels to drop upon the conveyer belt $k'$, which delivers both the shelled and the ear corn to the conveyer belt $k^6$, which delivers them into the box of a wagon attached at the rear of the tractor. To facilitate this movement of the corn the shaft $j^9$ is relatively higher than the shaft $k^4$, so that the conveyer belt $k'$ delivers on top of the endless conveyer belt $k^6$. If it is desired to silage the corn ears as well as the stalks the snapping and husking rollers $i^5$ and $i^6$ are removed from the machine, in which event the corn ears as well as the stalks will be reduced to ensilage and delivered together from the machine.

We claim:

1. A corn harvester comprising a harvester frame, a stalk cutter carried by said frame, means carried by said frame for husking and snapping the ears from the stalks, an ensilage cutter carried by said frame, means for feeding the stalks to said ensilage cutter, means for separating out shelled corn and feeding the husks to said ensilage cutter, and means for delivering the shelled corn and the ears together.

2. A corn harvester comprising a stalk cutter, means for husking and snapping the ears from the stalks, an ensilage cutter, means for feeding the severed stalks to said ensilage cutter, shaker members for separating out shelled corn and feeding the husks to said ensilage cutter, and means for delivering the shelled corn and the ears together.

3. A corn harvester comprising a stalk cutter, means for husking and snapping the ears from the stalks, an ensilage cutter, means for feeding the severed stalks to said ensilage cutter, shaker members spaced from each other and having upwardly and rearwardly slanting teeth for separating out shelled corn and feeding the husks to said ensilage cutter, and means for delivering the shelled corn and the ears together.

In testimony whereof we hereunto affix our signatures.

ANDREAN G. RONNING.
ADOLPH RONNING.